(12) United States Patent
Karlsson

(10) Patent No.: US 7,817,974 B2
(45) Date of Patent: *Oct. 19, 2010

(54) METHOD AND APPARATUS FOR ENHANCING THE DETECTION OF WEAK EMITTERS

(75) Inventor: Lars Karlsson, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/023,146

(22) Filed: Jan. 31, 2008

(65) Prior Publication Data

US 2009/0102718 A1    Apr. 23, 2009

Related U.S. Application Data

(63) Continuation-in-part of application No. 11/332,801, filed on Jan. 12, 2006.

(60) Provisional application No. 60/898,882, filed on Jan. 31, 2007.

(51) Int. Cl.
   *G06F 3/033* (2006.01)
(52) U.S. Cl. ............... 455/130; 455/556.1; 375/219
(58) Field of Classification Search ............. 455/130
   See application file for complete search history.

(56) References Cited

U.S. PATENT DOCUMENTS

| | | | |
|---|---|---|---|
| 6,480,142 B1 * | 11/2002 | Rubin | 342/26 R |
| 6,898,235 B1 * | 5/2005 | Carlin et al. | 375/219 |
| 2004/0214598 A1 * | 10/2004 | Parameswaran Rajamma | 455/556.1 |
| 2006/0028373 A1 * | 2/2006 | Fullerton et al. | 342/67 |
| 2006/0214598 A1 * | 9/2006 | Kang et al. | 315/169.4 |
| 2006/0227050 A1 * | 10/2006 | Vaughn, Jr. | 342/444 |

* cited by examiner

*Primary Examiner*—Duc Nguyen
*Assistant Examiner*—Ajibola Akinyemi

(57) ABSTRACT

A Method and Apparatus for Enhancing the Detection of Weak Emitters provide an enhanced method to eliminate the fake hits of a moving weak signal detection system. The method and apparatus have the abilities stated in the previous U.S. patent application Ser. No. 11/332,801 filed by this author, to do moving detection of weak signals, even in dense urban environments. Secondly, the method and apparatus includes additional antennas and hardware boards, in order to verify authenticity of detected targets. Thirdly, the method and apparatus include appropriate DSP algorithms loaded to program the mission. Fourthly, the method and apparatus are enabled to accurately determine the tangential distance of the target from me vehicles centerline. Finally, the method and apparatus provide the ability to continually discard false targets based upon the information provided by these approaches.

20 Claims, 4 Drawing Sheets

METHOD AND APPARATUS FOR ENHANCING THE DETECTION OF WEAK EMITTERS

This application is a continuation in part of application Ser. No. 11/332,801, filed Jan. 12, 2006, now pending.

This application is filed within one year of, and claims priority to Provisional Application Ser. No. 60/898,882, filed Jan. 31, 2007.

BACKGROUND OF THE INVENTION

1. Field of the Invention

This invention relates generally to electronic information surveillance and security systems and, more specifically, to a Method and Apparatus for enhancing the detection of Weak Emitters.

2. Description of Related Art

The embodiments of the present invention describe a significant enhancement to systems for detecting the presence and locations of weak emitters. The embodiments describe an enhanced way of detecting weak emitters utilizing the system described by U.S. patent application Ser. No. 11/332,801, by eliminating the false alarms through an innovative Doppler differentiation approach.

Details disclosed in previously filed U.S. patent application Ser. No. 11/332,801: "Method And Apparatus For Detecting The Presence And Locations Of Radio Controlled Improvised Explosive Devices In Real Time," are incorporated herein by reference in that the system and method of the present invention builds upon and/or modifies the basic design and operation disclosed in that application.

What is needed to eliminate the false alarms of a moving weak signals detection system (such as, for example, the "Street Sweeper" system described by patent application Ser. No. 11/332,801) is to augment that prior art system with the following: 1) The replacement of the roof antenna with two antennas, one on the front of the vehicle, and one on the rear, and 2) The addition of delay memory hardware and digital downconverters, and finally 3) The addition unique real-time algorithms, running on the DSP processors of the delayed digital downconverter outputs (these will be described future).

In conclusion, it is the inventor's position that no invention formerly developed provides this unique method to reduce the false alarms of moving weak signal detection systems through Doppler differentiation. This invention represents an important enhancement to me prior art method.

DETAILED DESCRIPTION OF THE EMBODIMENTS

The following description is provided to enable airy person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and Apparatus for Enhancing the Detection of Weak Emitters.

Figure 1:
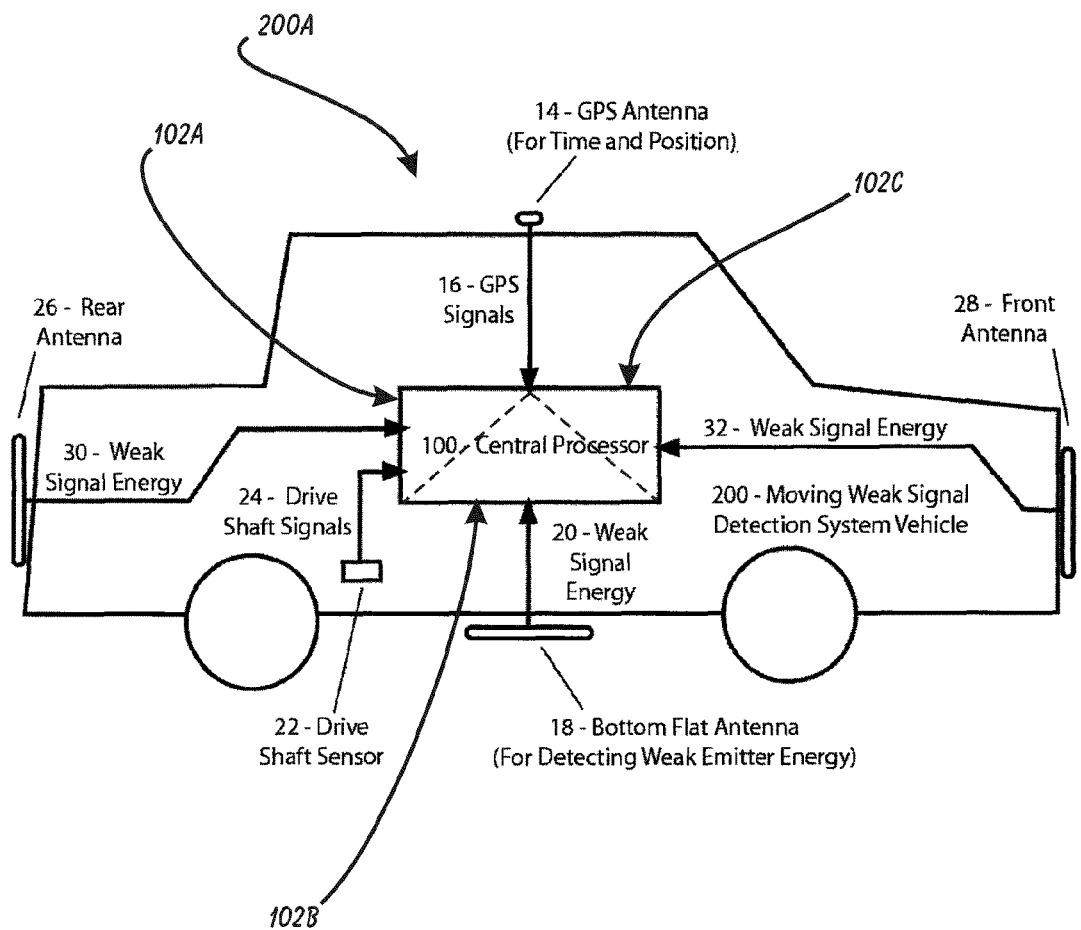
FIG. 1 shows a drawing of the system invention as it is typically installed inside a vehicle with the additional hardware antennas.

FIG. 1 shows a drawing of the system invention as it is typically installed inside a vehicle with the additional hardware antennas (Moving Weak Signal Detection System Vehicle 200) The operation of the original moving weak signal detection system design (outlined by patent application Ser. No. 11/332,801) will not be covered here. Only the augmentation of the embodiments of the present invention will be described in this document.

As before the vehicle detects the presence of weak emitter energy and logs detected anomalies in its event logs. This original detection is now used as a qualifier stage of identifying anomalies. The embodiments of the invention of this patent application takes all qualified "hits" and performs a more rigorous analysis.

When a qualifying hit signal is found by the wideband system (that process is defined by patent application Ser. No., 11/332,801), that particular frequency value is passed off to an internal firmware algorithm of the Central Processor 100 that then tasks two Direct Digital Downconverters (DDC's) to pluck out those signals and digitize them. The process of using DDC's to pluck out delayed, signals is described by a different previously filed U.S. patent application Ser. No. 10/829,858, entitled "Method And Apparatus For The Intelligent And Automatic Gathering of Sudden Short Duration Communications Signals," also written by this author.

The Front Antenna 28 and Rear Antenna 26 are both connected to the Central Processor 100. Note that the locations of the two antennas are of extreme importance to this invention (front and rear of the vehicle).

According to embodiments of the present invention the signals from these two antennas are also connected to delay memory modules. The purpose of this delay memory modules is that after the detection in the wideband system occurs, there is enough time for the Central Processor 100 to allocate the two DDC channels and tune them to the detected frequency. One DDC is allocated to monitor the signals from the front antenna and other one from the rear antenna. Thus it is possible to "go back" in time. The DDC's then hand off fee signals to DSP chips that use a much more narrowband FFT resolution (as opposed to the wideband FFT approach of the qualification stage. This more narrowband processing of the signals provides a better signal to noise ratio at the signal that was earlier Determined to be interesting by the wideband detector (qualification stage). The resulting FFT bin data streams are then fed to an FPGA where continuous frequency comparisons are performed to determine the maximum Doppler difference between the two signals received between the front and the back antennas.

Figure 2:
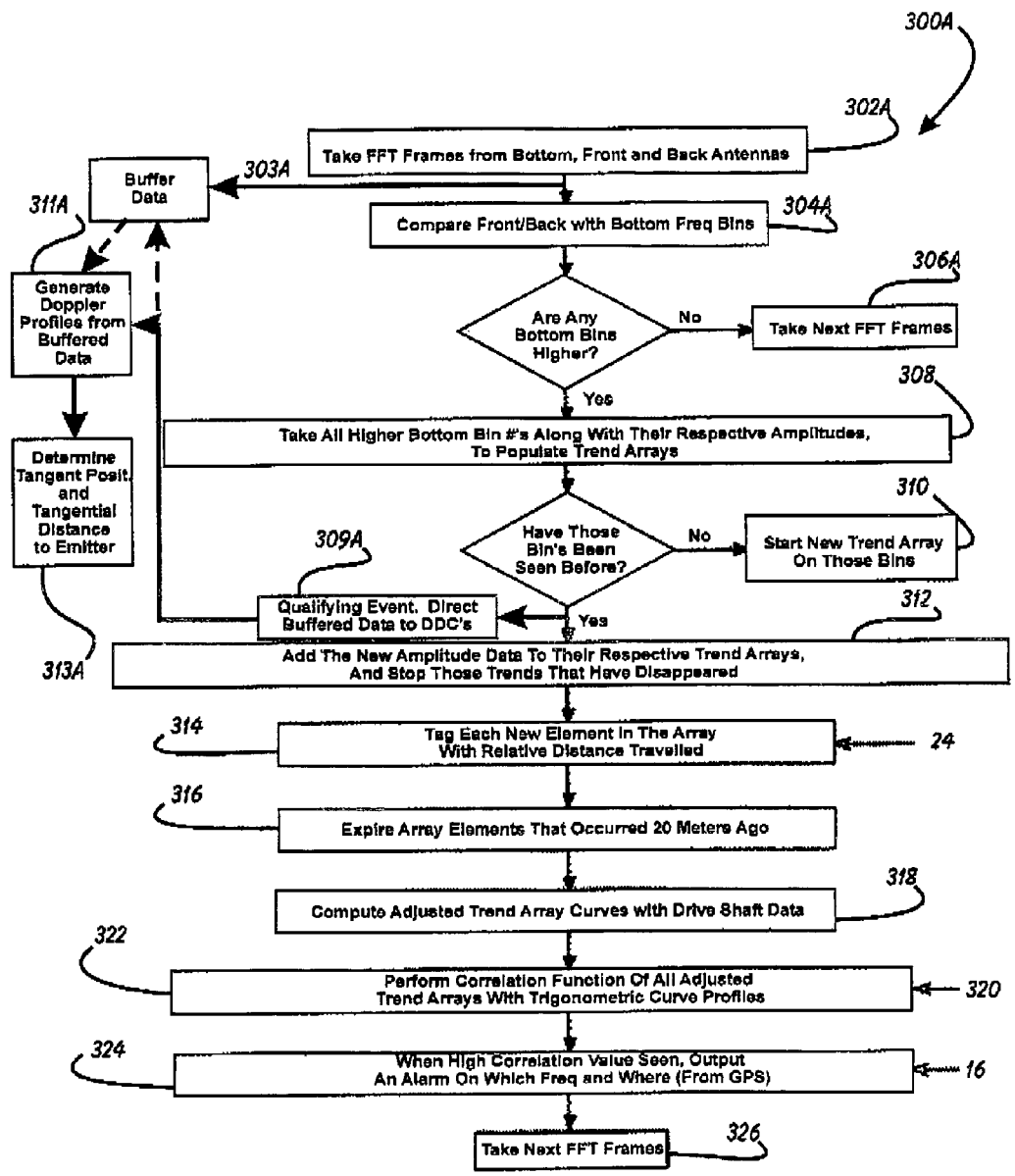
FIG. 2 is a flowchart depicting the signal processing method employed by the present invention.

FIG. 2 is a flowchart depicting the signal processing method 302A employed by the present invention.

As the vehicle 200A proceeds down the street, the receiver subsystems 102A-C of the central processor 100 are programmed to scan through a wide range of RF frequencies in synchronous fashion. Again, the operations of the receiver subsystems 102 (hereafter referred to as "Wideband Systems") are exactly the same as described by U.S. patent application Ser. No. 10/829,858.

The wideband systems 102A-C digitize large bandwidths of the RF spectrum for processing. One wideband receiver subsystem 102A is attached to the rear antenna 26, one wideband receiver subsystem 102B is attached to the bottom antenna 18, and one wideband receiver subsystem 102C is attached to the front antenna 28. Every time each receiver subsystem 102A-C produces a single n-point Fast Fourier Transformation (FFT) frame of information, the flames are sent to an algorithm that quickly compares those frames. An n-point EFT frame is comprised of n number of frequency measurements, or "bins" across the entire bandwidth.

As the FFT frames are collected from antennaes 302A, the bins of one of the ambient RF receiver subsystem 102A, C FFT frames are compared to the corresponding bin of the RCIED receiver subsystem 102B FFT frame that is taken at the same instant in time 304A.

The signals that come in from the wideband receiver subsystems 102A, C connected to the antennas 26, 28 will be different man the signals coming from the wideband receiver subsystem 102B connected to the bottom antenna 18 due to numerous factors. In most cases, the signals from the top antennas 26, 28 will have higher amplitudes than the signals from the bottom antenna 18 since the bottom antenna is facing towards the ground and thus is more isolated from the surrounding RF environment. The only time the FFT bin amplitudes from the bottom antenna 18 should be higher than the bin amplitudes from the top antennas 26,28 will be when a leakage signal from an RCIED is detected underneath (or beside) the vehicle 200. It is this phenomena that is exploited according to embodiments of the present invention.

Continuing forward, the system 100 calculates which bins received from the bottom antenna 18 have higher amplitudes than the corresponding top antenna's 26, 28 FFT bins 308. If the bins from the bottom subsystem 102B are not higher in amplitude than the corresponding bin of the top subsystems 102A, C, then the next FFT frames are processed 306A.

As high-amplitude bins are detected by the system 100, the system 100 takes those higher bins and labels them as "bins of interest". These bins of interest, and their respective amplitudes from the bottom antenna only, are then taken to another algorithm that begins to populate "trends" 308 which are finite numerical arrays of the amplitude data from one particular frequency bin number.

The operational modification of the present method 300A is that when bins have been seen before, it is considered to be a "Qualifying Event" 309A. This triggers the Buffered Data to be analyzed and the Doppler profiles are created for each set of buffered data 311A. These Doppler profiles are then used to determine the tangent position of the emitter and the tangential distance to that detected emitter 313A. Each element in these trend arrays is a successive frequency measurement (amplitude data from the bottom antenna, for a single bin of interest) over time.

If the FFT bins of interest have been seen before, i.e. trends have already been started for those bin numbers, then the new data points are simply placed into the end of those trend's arrays 312. If a bin of interest corresponds to a trend that has not been started before, then a new trend is begun 310. Finally, if existing trends do not have new data to add, that means that the signal amplitude from the bottom antenna 18 have ceased to be higher than the amplitude of the corresponding signals from the top antenna 10 for those particular trend's bin numbers (i.e. the signal eventually went away or the original trend was started on bad data). In such cases of trend dissipation, the system 100 will conclude that the trend is no longer of interest after the expiration of a specified period of time, as configurable by the system user 312.

The next step is to tag each new added element, of each trend, with a "distance tag" 314. This distance tag number comes from the drive shaft sensor algorithm, and is based upon an input from the drive shaft sensor that includes the sensor data 24. An algorithm calculates the relative distance the vehicle 200 traveled from when one measurement was taken to the very next. All data elements in an array that were recorded and are older man, for example, 20 meters are discarded 316. This is because it is necessary to bind the length of the trend arrays for the next stage of the signal processing, which is adjustment, after which comes correlation.

Operation

Figure 3A:
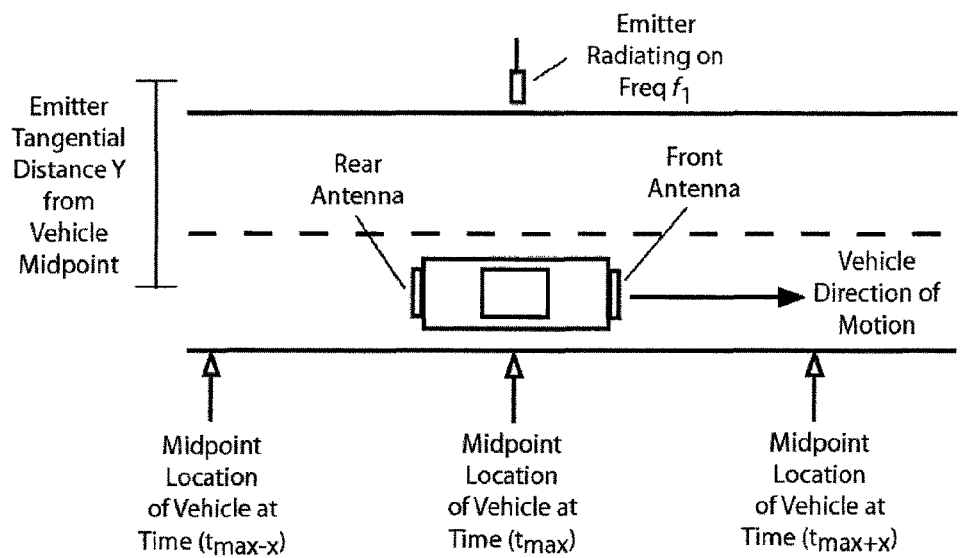
FIGS. 3A and 3B show graphical depictions of the invention as it is traveling down a roadway and how it's physical location relative to the weak emitter, equates to the signals that it is receiving from the front and rear antennas.
Figure 3B:
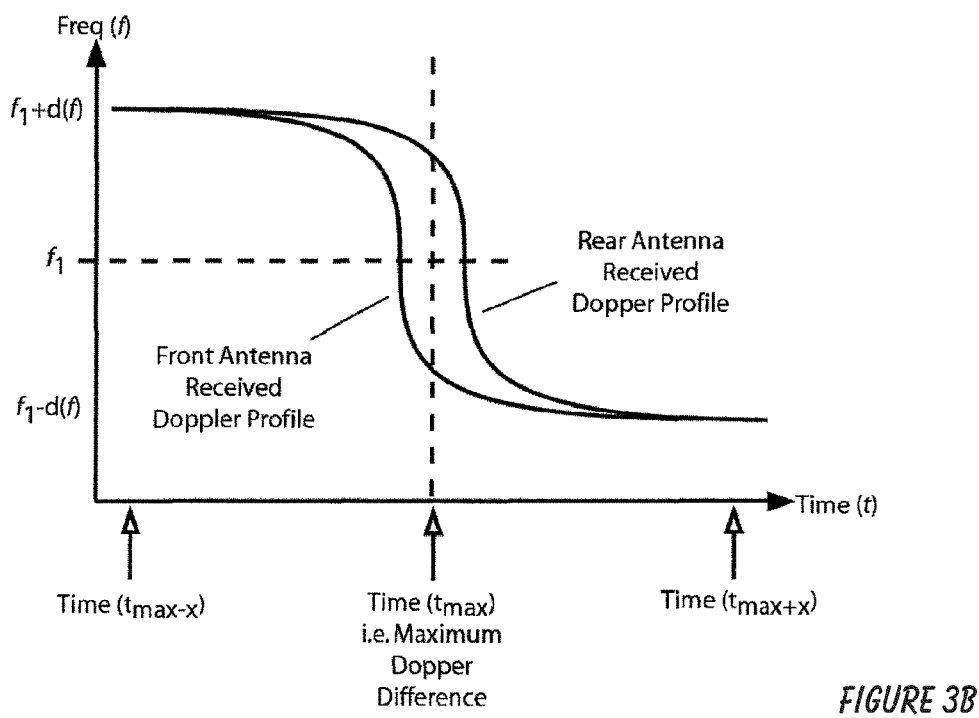

FIGS. 3A and 3B show graphical depictions of the invention as it is traveling down a roadway and how it's physical location relative to the weak emitter, equates to the signals that it is receiving from the front and rear antennas.

When the vehicle is approaching the emitter, the detected frequency emitted by that target will exhibit a Doppler effect. That is, the wavelengths will slightly compress and the detected frequency will go up slightly by a few Hz. Conversely, when the vehicle passes the emitter, the detected frequency will go slightly down by a few Hz, also due to the Doppler effect.

Figure 4A:
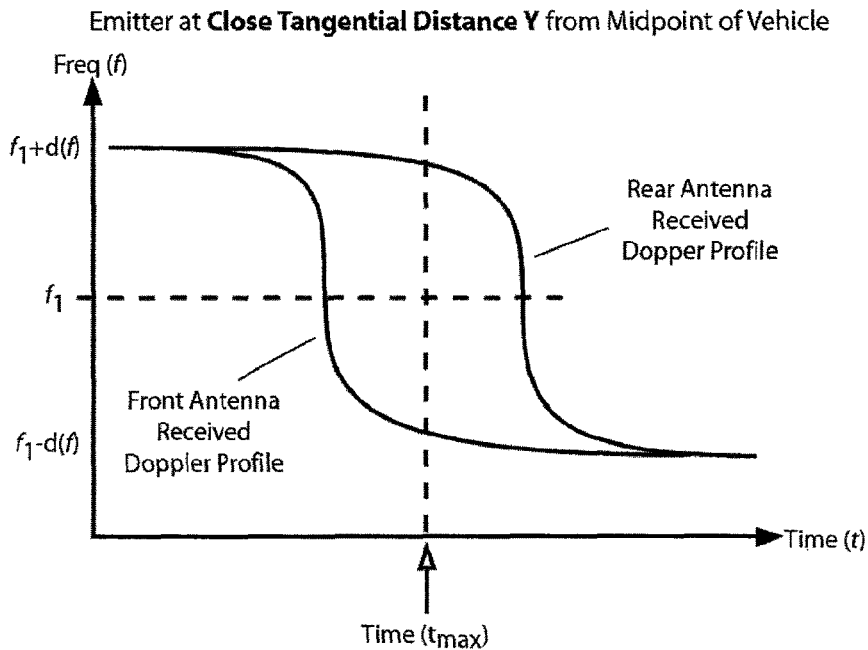
FIGS. 4A and 4B show the difference between two profiles and how those can be used to further resolve the tangential distance of the detected weak emitter from the centerline midpoint of the vehicle. This additional feature of the invention provides yet another discriminator to weed out false alarms.
Figure 4B:
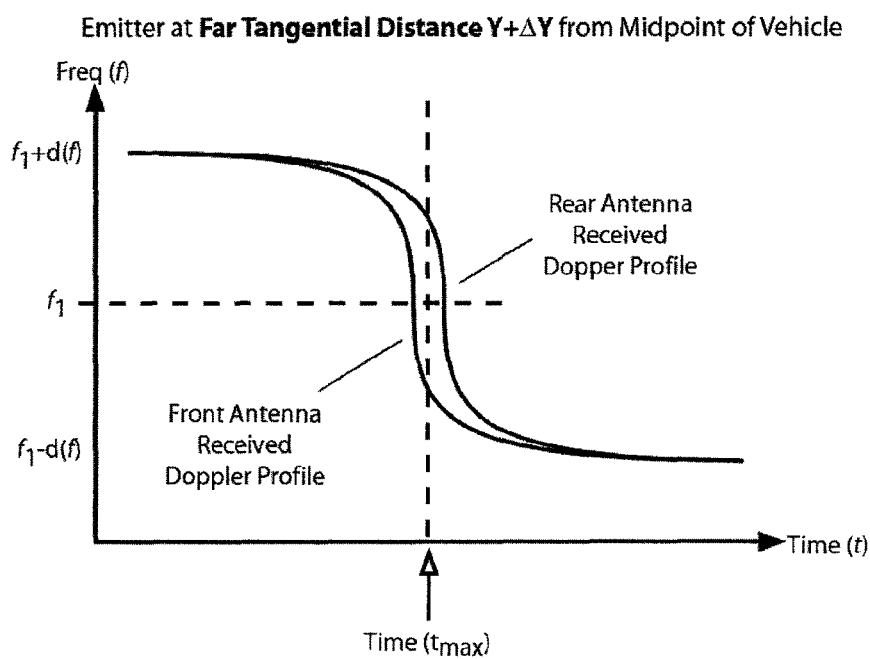

FIGS. 4A and 4B show he difference between two profiles and how those can be used to further resolve the tangential distance of the detected weak emitter from the centerline midpoint of the vehicle. This additional feature of the invention provides yet another discriminator to weed out false alarms.

This reality is exploited according to embodiments of the present invention. The two data forms are plotted over time. What can be seen by the drawing of FIG. 4B is that the detected Doppler shifts will both be identical, but yet offset in time. That is because the Front Antenna 28 will pass the emitter before the Rear Antenna 26 will. The maximum difference in frequencies between the two antennas can only result when the vehicle's midpoint is perpendicular to the location of the emitter with respect to the midpoint of the vehicle (i.e. the physical separation between the front and rear antennas). Embodiments of the present invention then mark the exact time that this maximum Doppler difference occurred and the central processor can then go back and determine the exact GPS location of the vehicle when that signal was received. This will give the location of the emitter on the roadway. But it will not directly give the distance the emitter is from the vehicle's centerline motion That calculation is done by a separate algorithm.

In order to determine the tangential distance of the emitter from the vehicle's centerline requires a calculation of the vehicle's velocity when it passed the target Again, the drive shaft sensor is used to determine the vehicle's velocity as it passed by the emitter. An algorithm is installed that calculates the maximum Doppler shift that would have been detected if the emitter was located directly on the cars centerline at the current speed and at the emitter's frequency. The further away from the centerline that the emitter is located the lower in frequency the Doppler difference signal will be. This will then give an accurate mathematical distance to the emitter's antenna from the vehicle's centerline. This calculation allows the system to weed out weak emitters mat are too tar from the vehicle to be considered a threat or "within the sphere of importance". This will also weed out all other spurious signals that were detected as "interesting" by fee wideband detector. Thus, the invention provides a unique way to eliminate the false alarms and at the same time provides a more accurate way to determine the distance of an emitter's antenna from the centerline of the moving weak signal detection system vehicle as it drives by.

DIAGRAM REFERENCE NUMERALS

14 GPS Antenna
16 GPS Signals
18 Bottom Flat Antenna
20 Weak Signal Energy Tom Bottom Antenna
22 Drive Shaft Sensor
24 Drive Shaft Signals
26 Rear Antenna
28 Front Antenna
30 Weak Signal Energy from Rear Antenna
32 Weak Signal Energy from Front Antenna
100 Central Processor
200 Moving Weak Signal Detection System Vehicle Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A mobile radio-controlled explosive device detection system, comprising:
   a first wideband signal collection front end subsystem, comprising:
     at least one wideband receiver for receiving RF signals transmitted by an RF signal transmitter across a broad spectrum said receiver comprising first and second antennas for receiving RF signals;
     a digitizer for creating an individual continuous stream of digitized data representing said RF signals received by said first and second antennas;
     a digital data converter for converting said individual digitized data stream into FFT frequency bins, each said FFT frequency bin defining an amplitude; and
     first and second data buffers for storing said data streams from said first and second antennaes in a buffer in a continuous stream;
   a second wideband signal collection front end subsystem, comprising:
     a wideband receiver for receiving RF signals transmitted by an RF signal transmitter across a broad spectrum said receiver comprising a third antennae for receiving RF signals;
     a digitizer for creating an individual continuous stream of digitized data representing said RF signals received by said third antennae;
     a digital data converter for converting said individual digitized data stream into FFT frequency bins, each said FFT frequency bin defining an amplitude; and
   a processor for i) comparing said amplitude of each said frequency bin of said first front end subsystem to said amplitude of each said time-coupled frequency bin of said second front end subsystem, and ii) when said comparison identifies a frequency bin of interest, analyzing the Doppler characteristics of said data from said buffer to determine the location of the transmitter of the received RF signals.

2. The system of claim 1, wherein said first wideband receiver antennas each comprise at least one antennae, each said antennae of said first subsystem and said antennae of said second subsystem mounted in vertical spaced relation.

3. The system of claim 2, said first and second antennas of said first wideband receiver are in horizontal spaced relation.

4. The system of claim 3, wherein said Doppler analyzing is responsive to an amplitude of said second wideband signal collection subsystem being greater than a corresponding amplitude of said first wideband signal collection subsystem.

5. The system of claim 4, wherein said Doppler analysis comprises determining the distance separating the Doppler shift detected by said first wideband receiver first antennae and said first wideband receiver second antennae.

6. The system of claim 5, wherein:
   said system further comprises distance detector for detecting a distance traveled by said system; and
   further comprising a trend recorder that associates and records said distance traveled between subsequent said recorded amplitudes of said compared frequency bins.

7. The system of claim 6, further comprising:
   a trend correlator for correlating said recorded trend array data to pre-determined trend array data; and
   an alerting element far generating an alert detectable by the human senses responsive to said trend correlator.

8. The system of claim 7, further comprising global position detector for detecting a globally-referenced position of said system.

9. The system of claim 8, wherein said trend correlator and said global position detector cooperate to associate a globally-referenced system position with a determined high value correlation between said recorded trend array data and said pre-determined array data.

10. The system of claim 9, wherein said alerting element alert further includes said associated globally-referenced system position for said system when said data resulting in said high value correlation was received by said signal collection systems.

11. A method for detecting radio-controlled explosive devices, comprising the steps of:
   collecting RF signals from a first signal collection subsystem mounted to said mobile platform;
   simultaneously collecting RF signals from a second signal collection system mounted to said mobile platform;
   simultaneously collecting RF signals from a third signal collection subsystem mounted to said mobile platform;
   determining frequency characteristics for said collected RF signals and responsively coupling said signals received by said first and third signal collection subsystem to said second signal collection subsystem;
   determining amplitude characteristics for said collected RF signals;
   comparing the amplitude of said RF signals collected by said first and third subsystem to said frequency-coupled signals collected by said second subsystem; and
   recording said frequency and amplitude data of said RF signals collected by said second signal collection system responsive to said comparing.

12. The method of claim 11, further comprising the steps of:
   saving data from each said signal collection subsystem in a buffer; and
   generating Doppler profiles of said buffered data of each said signal collection subsystem responsive to said comparing.

13. The method of claim 12, wherein said RF signal collection comprises said first and third antennas are vertically spaced from said second antennae by at least two feet.

14. The method of claim 12, further comprising the step of comparing said generated Doppler profiles to each other to determine the distance separating a Doppler shift detected by each said signal collection subsystem.

15. The method of claim 13, wherein said first and third collection steps comprise first and third antennas each respectively collecting incident RF signals, said first and third antennas in horizontal spaced relation.

16. The method of claim 15, wherein said second collection step comprises a second antennae collecting RF signals, said first and third antennas in vertical spaced relation to said second antennae.

17. The method of claim 16, further comprising the steps of:
moving said mobile platform during said signal collection steps;
detecting said platform movement; and
associating said detected movement with said recorded frequency and amplitude data.

18. The method of claim 17, further comprising the steps of:
correlating said recorded frequency and amplitude data with predetermined frequency and amplitude data to determine a correlation value; and
generating an alert detectable to the human senses when said correlation value exceeds a predetermined threshold.

19. The method of claim 18, further comprising the steps of:
detecting a global position of said mobile platform;
associating said global platform position with each said correlated collected RF signals; and
including said associated global platform position in said generated alert.

20. The method of claim 19, wherein said RF signal collection comprises said first signal collection subsystem collecting said signals through a first antennae and said second signal collection subsystem collecting said signals through a second antennae, said first and second antennae in vertical relative spaced relation.

* * * * *

UNITED STATES PATENT AND TRADEMARK OFFICE
CERTIFICATE OF CORRECTION

PATENT NO. : 7,817,974 B2
APPLICATION NO. : 12/023146
DATED : October 19, 2010
INVENTOR(S) : Lars Karlsson It is certified that error appears in the above-identified patent and that said Letters Patent is hereby corrected as shown below:

On the Title page, item (57), under "Abstract", in column 2, line 13, delete "me" and insert -- the --, therefor.

In column 6, line 19, in Claim 7, delete "far" and insert -- for --, therefor.

In column 6, line 28, in Claim 9, delete "array" and insert -- trend array --, therefor.

In column 6, line 36, in Claim 11, delete "said" and insert -- a --, therefor.

In column 6, line 38, in Claim 11, delete "system" and insert -- subsystem --, therefor.

In column 6, line 66, in Claim 15, delete "claim 13," and insert -- claim 14, --, therefor.

Signed and Sealed this
Twenty-fifth Day of January, 2011

David J. Kappos
*Director of the United States Patent and Trademark Office*